US010187574B1

United States Patent
Gigot (10) Patent No.: US 10,187,574 B1
(45) Date of Patent: *Jan. 22, 2019

(54) POWER-SAVING BATTERY-OPERATED CAMERA

(71) Applicant: Ambarella, Inc., Santa Clara, CA (US)

(72) Inventor: Jerome N. Gigot, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,334

(22) Filed: Jan. 18, 2018

Related U.S. Application Data (63) Continuation of application No. 15/092,812, filed on Apr. 7, 2016, now Pat. No. 9,906,722.

(51) Int. Cl.
*H04N 5/235* (2006.01)
*H04N 5/33* (2006.01)
*H04N 5/232* (2006.01)
*H04N 5/77* (2006.01)

(52) U.S. Cl.
CPC ....... *H04N 5/23241* (2013.01); *H04N 5/2351* (2013.01); *H04N 5/33* (2013.01); *H04N 5/77* (2013.01)

(58) Field of Classification Search
CPC .... H04N 5/23241; H04N 5/33; H04N 5/2351; H04N 5/77
See application file for complete search history.

(56) References Cited

U.S. PATENT DOCUMENTS

| 5,915,069 | A | 6/1999 | Nishijima | 348/143 |
| 7,028,328 | B2* | 4/2006 | Kogane | G08B 13/19634 348/143 |
| 8,018,338 | B2* | 9/2011 | Huang | G08B 13/191 250/342 |
| 8,230,246 | B1 | 7/2012 | Sharkey | 345/158 |
| 2001/0031129 | A1 | 10/2001 | Tajima | 386/241 |
| 2004/0196369 | A1* | 10/2004 | Fukasawa | H04N 7/18 348/155 |
| 2006/0024020 | A1* | 2/2006 | Badawy | G08B 13/19641 386/228 |
| 2006/0215030 | A1* | 9/2006 | Shih | G08B 13/19652 348/155 |
| 2008/0136914 | A1* | 6/2008 | Carlson | G08B 7/06 348/155 |
| 2009/0259865 | A1 | 10/2009 | Sheynblat | 713/323 |
| 2009/0295919 | A1 | 12/2009 | Chen | 348/143 |
| 2010/0265344 | A1 | 10/2010 | Verlarde | 348/208.16 |
| 2011/0081160 | A1 | 4/2011 | Yoon | 399/88 |
| 2012/0096290 | A1 | 4/2012 | Shkolnikov | 713/320 |

(Continued)

*Primary Examiner* — Hung H Lam
(74) *Attorney, Agent, or Firm* — Christopher P. Maiorana, PC (57) ABSTRACT

An apparatus including a plurality of detection devices, a processor and a controller. The plurality of detection devices may each be configured to detect an object in a respective zone. The processor may be configured to (i) perform analysis of one or more frames of a video captured by an image sensor and (ii) evaluate a detection of the object by at least one of the detection devices based on the analysis. The controller may be configured to (i) activate the processor in response to the object detected by at least one of the detection devices and (ii) provide feedback to at least one of the detection devices based on the evaluation by the processor.

20 Claims, 8 Drawing Sheets

(56) References Cited

U.S. PATENT DOCUMENTS

| | | |
|---|---|---|
| 2012/0147531 A1 | 6/2012 | Rabii .................. 361/679.01 |
| 2013/0193855 A1* | 8/2013 | Bauer .................. G01C 11/02 |
| | | 315/151 |
| 2014/0032880 A1 | 1/2014 | Ka .................. 712/30 |
| 2014/0208333 A1 | 7/2014 | Beals .................. 719/318 |
| 2014/0267811 A1 | 9/2014 | Bhat .................. 348/208.16 |
| 2015/0206415 A1 | 7/2015 | Wegelin .................. 340/573.4 |
| 2016/0006988 A1 | 1/2016 | Zhao .................. 348/155 |

* cited by examiner

POWER-SAVING BATTERY-OPERATED CAMERA

This application relates to U.S. Ser. No. 15/092,812, filed Apr. 7, 2016, which is incorporated by reference in its entirety.

FIELD OF THE INVENTION

The present invention relates to video capture devices generally and, more particularly, to a method and/or apparatus for implementing a power-saving battery-operated camera.

BACKGROUND OF THE INVENTION

Battery-powered internet protocol (IP) cameras are more convenient than tethered (i.e., AC-powered) cameras because a battery-powered camera can be installed anywhere. One drawback of a conventional battery-powered IP camera is battery life. In conventional battery-powered IP cameras, batteries need to be replaced regularly for the IP camera to operate. For some conventional battery-powered IP cameras, batteries need to be replaced as often as every week. When cameras are installed in hard-to-reach or distant locations, replacing batteries can be a major inconvenience and limit the usefulness of the camera.

One cause for short battery life is false alarms. Every time there is a false alarm, the camera will spend limited battery time recording unwanted or useless video and/or uploading the unwanted video to a network.

It would be desirable to implement a power-saving battery-operated camera.

SUMMARY OF THE INVENTION

The present invention concerns an apparatus including a plurality of detection devices, a processor and a controller. The plurality of detection devices may each be configured to detect an object in a respective zone. The processor may be configured to (i) perform analysis of one or more frames of a video captured by an image sensor and (ii) evaluate a detection of the object by at least one of the detection devices based on the analysis. The controller may be configured to (i) activate the processor in response to the object detected by at least one of the detection devices and (ii) provide feedback to at least one of the detection devices based on the evaluation by the processor.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing a power-saving battery-operated camera that may (i) reduce a number and/or frequency of false alarms, (ii) provide a multi-step approach to powering on a camera, (iii) provide feedback to detection devices used to power on a camera, (iv) perform video analytics to confirm objects detected, (v) adjust detection thresholds of detection devices, (vi) provide a programmable filter to reduce false power on cycles, and/or (vii) be cost-effective to implement.

A camera (e.g., a battery-powered IP camera) may be configured to reduce false alarms by performing video analytics locally on video frames captured by the camera. The camera may filter out some of the false alarms, and only record useful video (e.g., video comprising objects of interest to a user) in order to increase (e.g., extend) battery life. In order to perform local video analytics to determine whether a false alarm has occurred, the battery-powered IP camera may be in a powered on (or high power consumption) state. While in the powered on state, the battery-powered IP camera may be consuming available battery power at a relatively high rate. The battery-powered IP camera may comprise various sensors (or detectors) to initiate a wake-up for the camera from a power state that consumes battery power at a relatively low rate. The camera may remain in a powered-down (or sleep) state until pre-configured conditions have been met that initiate the wake-up. When the pre-configured conditions have been met, the camera may be powered on and perform the video analytics (e.g., to determine whether there is a false alarm situation). For example, in the power-down state some components may be active (e.g., a minimum amount of components to provide functionality to initiate a wake-up of other inactive components). In another example, in a higher-power state a greater number of components may be activated to provide greater functionality.

In an example implementation, the battery-powered IP camera may be implemented as an intelligent camera configured to filter out false alarms. The battery-powered IP camera may implement a programmable filter. The battery-powered IP camera may perform multiple steps to reduce a number of false alarms. In an example, the battery-powered IP camera may perform (e.g., run) video analytics to filter out false alarms. In another example, the battery-powered IP camera may use various sensor types to prevent false alarms (e.g., pre-screen detections based on various sensor input detected in an environment). In yet another example, the battery-powered IP camera may reconfigure (e.g., update) various components in order to limit a probability of being woken up again in the future by false alarms (e.g., learn from previous results). Reducing a number of false alarms may increase a battery life of the camera.

A false alarm may result in response to any type of input that causes the battery-powered IP camera to enter a higher power state to record an environment when there is nothing of interest (e.g., no objects) to record. In an example where the battery-powered IP camera is implemented as a security camera configured to record people trespassing, the false alarm may be when the battery-powered IP camera is activated but there are no people in a field of view of the camera. In another example where the battery-powered IP camera is implemented as a trail camera configured to record wildlife, the false alarm may be when the battery-powered IP camera is activated but there is no wildlife in the field of view of the camera. In yet another example, where the battery-powered IP camera is implemented as a wearable action camera (e.g., a sports camera configured to record an athlete performing) a false alarm may be when the battery-powered IP camera is activated and the athlete of interest is not performing. In still another example, where the battery-powered IP camera is implemented as a baby monitor, a false alarm may be when the battery-powered IP camera is activated and the baby is not present (or the baby did not move). In some embodiments, the objects of interest may be selected by an operator of the camera. In some embodiments, the objects of interest may be stored in a memory. The types of objects of interest and/or false alarms may be varied according to the design criteria of a particular implementation.

Figure 1:
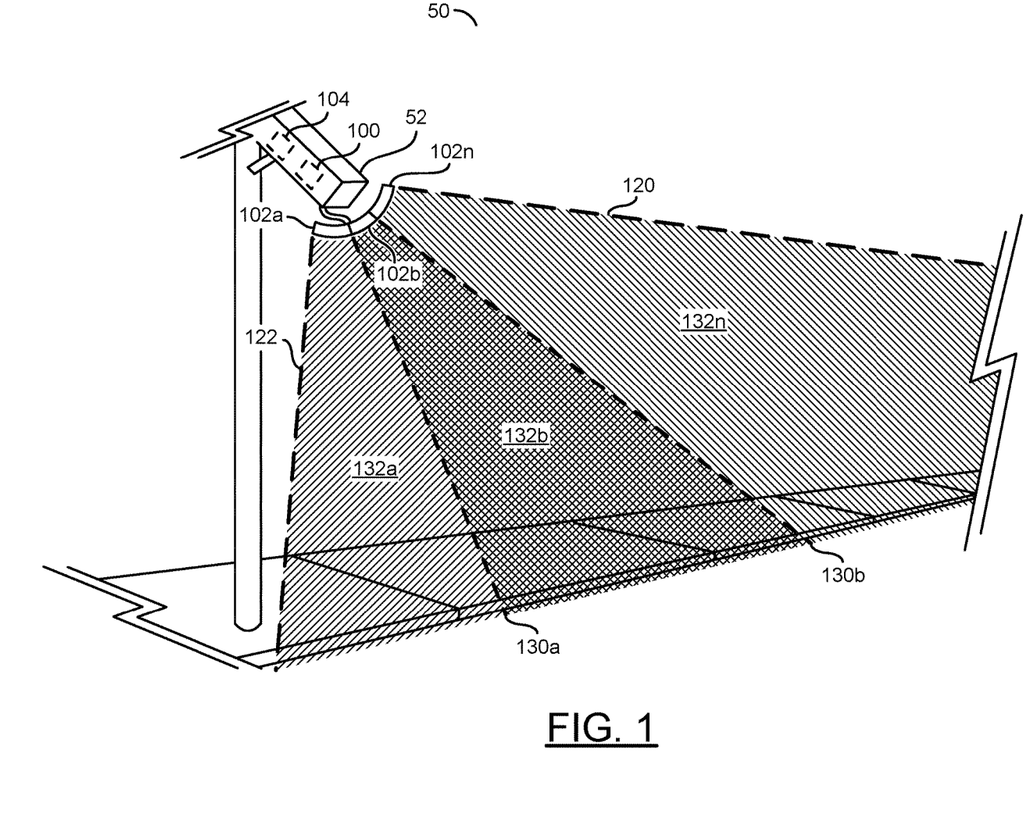
FIG. 1 is a diagram illustrating an example embodiment of an apparatus in accordance with the present invention.

Referring to FIG. 1, a system 50 illustrating an example embodiment of an apparatus in accordance with the present invention is shown. The system 50 shows a camera 52 directed at an environment. In an example, the camera 52 may be a battery-powered IP camera. The battery-powered IP camera 52 may comprise a block (or circuit) 100, a blocks (or circuits) 102a-102n and/or a block (or circuit) 104. The circuit 100 may be a processor (or system-on-chip (SoC)). The circuits 102a-102n and the circuit 104 may be detection devices. The detection devices 102a-102n and/or 104 may be configured to detect and/or measure various types of input from the environment (e.g., light, motion, heat, sound, smoke, carbon monoxide, Wi-Fi signals, etc.). For example, one or more of the detection devices 102a-102n may be implemented as a microphone configured to measure audio levels. The detection devices 102a-102n and/or 104 may be sensors. Other blocks (or circuits or components) of the camera 52 may be implemented. Details of the components of the camera 52 may be described in more detail in association with FIG. 2. The components of the camera 52 may be varied according to the design criteria of a particular implementation.

The camera 52 may be configured to capture (e.g., record) a field of view. One edge of the field of view of the camera 52 may be the line 120. Another edge of the field of view of the camera 52 may be the line 122. In an example, the field of view of the camera 52 may be a range from the line 120 to the line 122. The range of the field of view 120-122 may be varied according to the design criteria of a particular implementation.

The detection devices 102a-102n may be motion sensors. In an example, the motion sensors 102a-102n may be passive infrared (PIR) sensors. Each of the motion sensors 102a-102n is shown directed towards a location in the field of view of the camera 52. Each of the motion sensors 102a-102n is shown providing coverage for a portion of the field of view of the camera 52. In an example, the motion sensor 102a is shown providing coverage from the line 122 to the line 130a. In another example, the motion sensor 102b is shown providing coverage from the line 130a to the line 130b. In yet another example, the motion sensor 102n is shown providing coverage from the line 130b to the line 120. In some embodiments, the motion sensors 102a-102n may be directed to locations outside of the field of view of the camera 52.

The portion of coverage of each of the motion sensors 102a-102n may be a zone. In an example, a zone 132a may range from the line 122 to the line 130a and be covered by the motion sensor 102a. In another example, a zone 132b may range from the line 130a to the line 130b and be covered by the motion sensor 102b. In yet another example, a zone 134n may range from the line 130b to the line 120 and be covered by the motion sensor 102n. Other zones may be implemented. While the zones 132a-132n are shown not overlapping, in some embodiments the zones 132a-132n may overlap. The number, size and/or arrangement of the zones may be varied according to the design criteria of a particular implementation.

Figure 2:
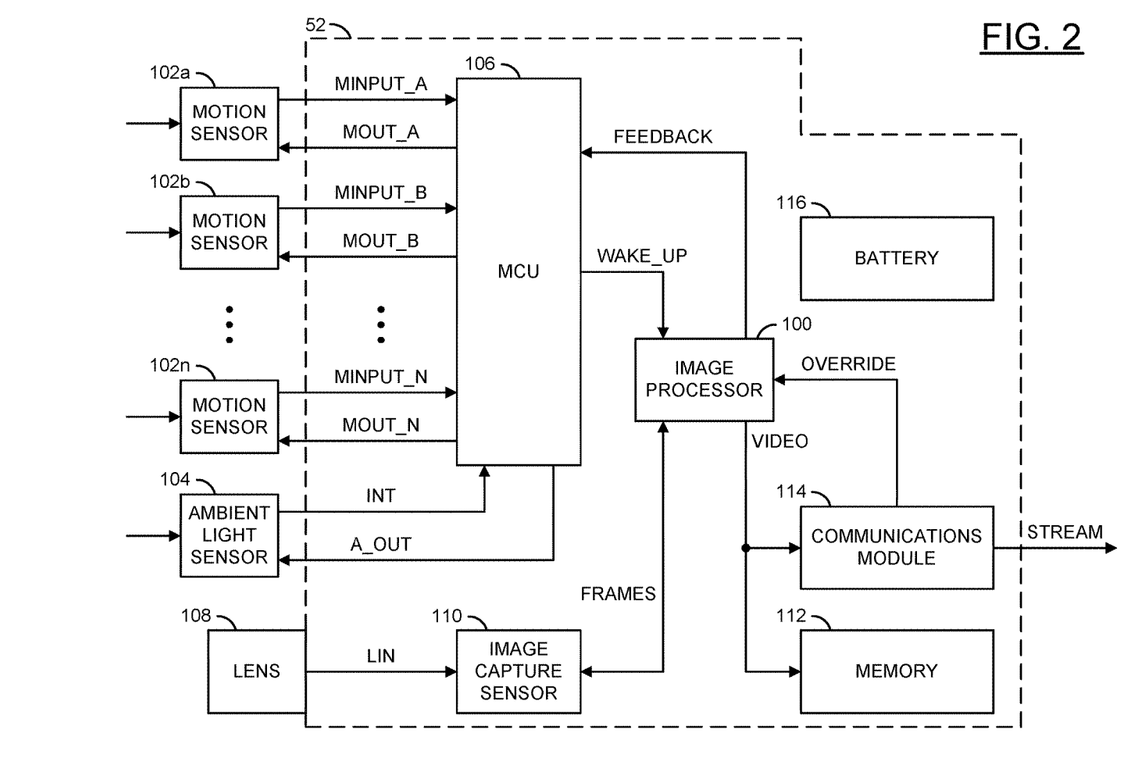
FIG. 2 is a block diagram of an example embodiment of an apparatus in accordance with the present invention.

Referring to FIG. 2, a block diagram of the camera 52 is shown. The camera 52 may comprise the image processor 100, the motion sensors 102a-102n, the detection device 104, a block (or circuit) 106, a lens 108, a block (or circuit) 110, a block (or circuit) 112, a block (or circuit) 114 and/or a block (or circuit) 116. The circuit 106 may be a microcontroller unit (MCU). The circuit 110 may be an image capture sensor. The circuit 112 may be a memory circuit. The circuit 114 may be a communications module. The block 116 may be a battery. Other components may be implemented. The number, type and/or arrangement of the components of the camera 52 may be varied according to the design criteria of a particular implementation.

The motion sensors 102a-102n may be configured to detect motion (e.g., in the zones 132a-132n). The detection of motion may be used as one threshold for identifying an object. The motion sensors 102a-102n may be implemented as components of the camera 52 and/or as components external to the camera 52. The motion sensors 102a-102n may each generate a respective signal (e.g., MINPUT_A-MINPUT_N) in response to motion being detected in one of the respective zones 132a-132n. The signals MINPUT_A-MINPUT_N may be presented to the MCU 106. In an example, the motion sensor 102b may generate the signal MINPUT_B when motion is detected in the zone 132b. The motion sensors 102a-102n may each receive a respective signal (e.g., MOUT_A-MOUT_N) from the MCU 106. The signals MOUT_A-MOUT_N may be feedback. In an example, the signals MOUT_A-MOUT_N may be implemented to disable, shut down and/or configure a sensitivity of the motion sensors 102a-102n.

The detection device 104 may be a segmented ambient light sensor. The segmented ambient light sensor 104 may be configured to detect light levels at various locations. The light levels (e.g., a low light level) may be one threshold for identifying an object. The segmented ambient light sensor 104 may be implemented as a component of the camera 52 and/or as a component external to the camera 52. The segmented ambient light sensor 104 may generate an interrupt signal (e.g., INT) in response to an amount of light at various portions (e.g., segments) of the segmented ambient light sensor 104. The signals INT may be presented to the MCU 106. The segmented ambient light sensor 104 may receive a signal (e.g., A_OUT) from the MCU 106. The signal A_OUT may be feedback. In an example, the signal A_OUT may be implemented to disable, shut down and/or configure a sensitivity of one or more segments of the segmented ambient light sensor 104.

The MCU 106 may be configured to control an activation of various components of the camera 52. The MCU 106 may be configured to operate in a low-powered mode of operation. In an example, the MCU 106 may operate when the camera 52 (e.g., the image processor 100) is powered off, in a very low power state and/or in a sleep state. By operating in a low-powered mode of operation, the MCU 106 may control which components of the camera 52 are activated without causing a large power consumption of the battery 116.

The MCU 106 may receive input from the motion sensors 102a-102n (e.g., the signals MINPUT_A-MINPUT_N) and/or input from the segmented ambient light sensor 104 (e.g., the signal INT). In response to the signals MINPUT_A-MINPUT_N and/or INT, the MCU 106 may activate one or more sensors (e.g., the motion sensors 102a-102n and/or the ambient light sensor 104) and/or the processor 100. In an example, the motion sensor 102a may detect motion in the zone 132a and present the signal MINPUT_A to the MCU 106 and in response to the signal MINPUT_A, the MCU 106 may generate the signal A_OUT to activate the ambient light sensor 104. In another example, the ambient light sensor 104 may detect a change in light and present the signal INT to the MCU 106 and in response to the signal INT, the MCU 106 may generate the signals MOUT_A-MOUT_N to activate the motion sensors 102a-102n.

The MCU 106 may generate the signal WAKE_UP in response to the signals MINPUT_A-MINPUT_N and/or the signal INT. The signal WAKE_UP may enable an activation of the processor 100. In an example, one or more of the motion sensors 102a-102n may detect motion and present the signals MINPUT_A-MINPUT_N to the MCU 106 and in response to the signals MINPUT_A-MINPUT_N the MCU 106 may present the signal WAKE_UP to the processor 100. In another example, the ambient light sensor 104 may detect a change in light and present the signal INT to the MCU 106 and in response to the signal INT, the MCU 106 may generate the signal WAKE_UP to activate the processor 100.

The MCU 106 may be configured to receive a feedback signal (e.g., FEEDBACK) from the processor 100. The signal FEEDBACK may provide configuration data to the MCU 106 to adjust the motion sensors 102a-102n and/or the ambient light sensor 104 in response to false alarms. The feedback from the processor 100 may be presented to the motion sensors 102a-102n via the signals MOUT_A-MOUT_N. The feedback from the processor 100 may be presented to the ambient light sensor 104 via the signal A_OUT.

The lens 108 may be aimed to capture environmental data (e.g., light). In some embodiments, the lens 108 may be a wide-angle lens and/or a fish-eye lens (e.g., a lens capable of capturing a wide field of view). The lens 108 may be configured to capture and/or focus the light (e.g., LIN) for the image capture sensor 110. Generally, the image capture sensor 110 is located behind the lens 108. Based on the captured light from the lens 108, the image capture sensor 110 may generate bitstreams and/or video data.

The image capture sensor 110 may receive light (e.g., LIN) from the respective lens 108 and transform the light into digital data (e.g., the bitstream). The bitstream may be presented as a signal (e.g., FRAMES) to the processor 100. For example, the image capture sensor 110 may perform a photoelectric conversion of the light (e.g., LIN) from the lens 108. The image capture sensor 110 may transform the bitstream into a human viewable content (e.g., video data that may be understandable to an average person regardless of image quality, such as video frames).

The processor 100 may be configured to receive pure (e.g., raw) data from the capture sensor 110 and generate (e.g., encode) video data based on the raw data (e.g., the bitstream). The video data (e.g., VIDEO) may be presented to the memory 112 and/or the communications module 114. The processor 100 may be configured to be activated in response to the signal WAKE_UP and/or a signal (e.g., OVERRIDE) from the communications module 114. In some embodiments, the processor 100 may activate the image capture sensor 110 in response to the signal WAKE_UP and/or the signal OVERRIDE. The processor 100 may be configured to present the signal FEEDBACK to the MCU 106 based on video analytics performed by the processor 100 and the input received from the sensors 102a-102n and/or 104.

The processor 100 may be configured to analyze the captured video content (e.g., the signal FRAMES) in real time to detect objects and/or extract data from the video. Video analytics performed by the processor 100 on the video frames captured by the image sensor 110 may be used to detect objects. Objects may be detected by comparing video data in the signal FRAMES with previously stored reference objects (e.g., stored in the memory 112). The techniques implemented by the processor 100 to find objects in a scene may comprise motion detection, deep learning techniques, compensation for sensor noise, detecting light changes, comparing a size of objects, determining a motion speed of objects, detecting partial occlusions, determining periodic motion and/or determining positive rejections.

The feedback from the processor 100 may comprise shutting off one or more of the motion sensors 102a-102n in response to false alarms generated by the motion sensors 102a-102n. For example, the motion sensor 102b may detect motion and in response to the signal MINPUT_B, the MCU 106 may present the signal WAKE_UP to the processor 100. The processor 100 may perform the video analytics. If the video analytics determine no object of interest is in the field of view of the lens 108, the processor 100 may determine a false alarm has been triggered by the motion sensor 102b and generate the signal FEEDBACK. In response to information in the signal FEEDBACK, the MCU 106 may generate the signal MOUT_B to provide the feedback to the motion sensor 102b. For example, if the processor 100 determines the motion sensor 102b has triggered false alarms multiple times, the processor 100 may generate the signal FEEDBACK to shut off the motion sensor 102b. In another example, if the processor 100 determines the motion sensor 102b has triggered false alarms multiple times, the processor 100 may generate the signal FEEDBACK to adjust a sensitivity level of the motion sensor 102b. The type of feedback implemented for the motion sensors 102a-102n may be varied according to the design criteria of a particular implementation.

The feedback from the processor 100 to the ambient light sensor 104 may comprise adjusting a sensitivity (e.g., increasing a detection threshold) for segments of the ambient light sensor 104 in a particular area that is generating the false alarms. For example, one or more segments of the ambient light sensor 104 may pass a detection threshold of ambient light and the ambient light sensor 104 may present the signal INT to the MCU 106. In response to the signal INT, the MCU 106 may present the signal WAKE_UP to activate the processor 100. The processor 100 may perform the video analytics. If the video analytics determine no object of interest is in the field of view of the lens 108, the processor 100 may determine a false alarm has been triggered by the ambient light sensor 104 and generate the signal FEEDBACK. In response to information in the signal FEEDBACK, the MCU 106 may generate the signal A_OUT to provide the feedback to the ambient light sensor 104. For example, if the processor 100 determines particular segments of the motion sensor 104 have triggered false alarms multiple times, the processor 100 may generate the signal FEEDBACK to increase a detection threshold of the particular segments of the ambient light sensor 104 that are triggering the false alarms. The type of feedback implemented for the ambient light sensor 104 may be varied according to the design criteria of a particular implementation.

The memory 112 may store various data for the camera 52. The memory 112 may be implemented as a magnetic-disk hard drive, flash memory, RAM, etc. In some embodiments, the memory 112 may store a recording of the video data VIDEO. In some embodiments, the memory 112 may store reference objects for comparisons performed by the processor 100 when detecting the objects. In some embodiments, the memory 112 may store data about the motion sensors 102a-102n and/or the ambient light sensor 104. For example, the memory 112 may store a number of false alarms triggered by a particular one of the motion sensors 102a-102n. In another example, the memory 112 may store a number of false alarms triggered by particular segments of the ambient light sensor 104. The size of the memory 112 and/or the type of information stored by the memory 112 may be varied according to the design criteria of a particular implementation.

The communications module 114 may be configured to implement one or more communications protocols. For example, the communications module 114 may be configured to implement Wi-Fi, Bluetooth, Ethernet, etc. Since the camera 52 is implemented as a wireless IP camera, the protocol implemented by the communications module 114 may be a wireless communications protocol. The type of communications protocols implemented by the communications module 114 may be varied according to the design criteria of a particular implementation.

The communications module 114 may be configured to generate a signal (e.g., STREAM) as an output from the camera 52. The signal STREAM may send the video data VIDEO to external devices. For example, the signal STREAM may be sent to a cloud storage service (e.g., a storage service capable of scaling on demand). In some embodiments, the communications module 114 may not transmit data until the processor 100 has performed video analytics to determine that an object is in the field of view of the lens 108.

In some embodiments, the communications module 114 may be configured to generate the signal OVERRIDE. The signal OVERRIDE may be generated in response to a signal from a user received by the communications module 114. The signal OVERRIDE may be configured to activate the processor 100. The processor 100 may be activated in response to the signal OVERRIDE regardless of the power state of the camera 52 (e.g., even if the MCU 106 has not presented the signal WAKE_UP).

The battery 116 may be configured to provide power for the various components of the camera 52. The multi-step approach to activating and/or disabling the motion sensors 102a-102b, the ambient light sensor 104, the processor 100 and/or any other power consuming features of the camera 52 may be implemented to reduce a power consumption of the battery 116. The motion sensors 102a-102n may have a very low drain on the battery 116 (e.g., less than 10 μW). In an example, the motion sensors 102a-102n may be configured to remain on (e.g., always active) unless disabled in response to feedback from the processor 100. The ambient light sensor 104 may have a higher drain on the battery 116 than the motion sensors 102a-102n (e.g., greater than 5 mW) but a lower drain on the battery 116 than the processor 100. In an example, the ambient light sensor 104 may be in an inactive state until the MCU 106 presents the signal A_OUT in response to one or more of the signals MINPUT_A-MINPUT_N. The video analytics performed by the processor 100 may have a large drain on the battery 116 (e.g., greater than the motion sensors 102a-102n and/or the ambient light sensor 104). In an example, the processor 100 may be in a low-power state (or power-down) until the MCU 106 presents the signal WAKE_UP in response to the signal INT generated by the ambient light sensor 104.

The camera 52 may be configured to operate using various power states. For example, in the power-down state (e.g., a sleep state, a low-power state) the motion sensors 102a-102n and the MCU 106 may be on and other components of the camera 52 (e.g., the processor 100, the ambient light sensor 104, the image capture device 110, the memory 112, the communications module 114, etc.) may be off. In another example, the camera 52 may operate in an intermediate state. In the intermediate state the ambient light sensor 104 and the MCU 106 may be on and the image capture device 110, the memory 112 and/or the communications module 114 may be off. In yet another example, the camera 52 may operate in a power-on (or high power) state. In the power-on state, the motion sensors 102a-102n, the ambient light sensor 104, the MCU 106, the processor 100, the image capture sensor 110, the memory 112 and/or the communications module 114 may be on. The camera 52 may consume some power from the battery 116 in the power-down state (e.g., a relatively small and/or minimal amount of power). The camera 52 may consume more power from the battery 116 in the power-on state. The amount of power states and/or the components of the camera 52 that are on while the camera 52 operates in each of the power states may be varied according to the design criteria of a particular implementation.

Figure 3:
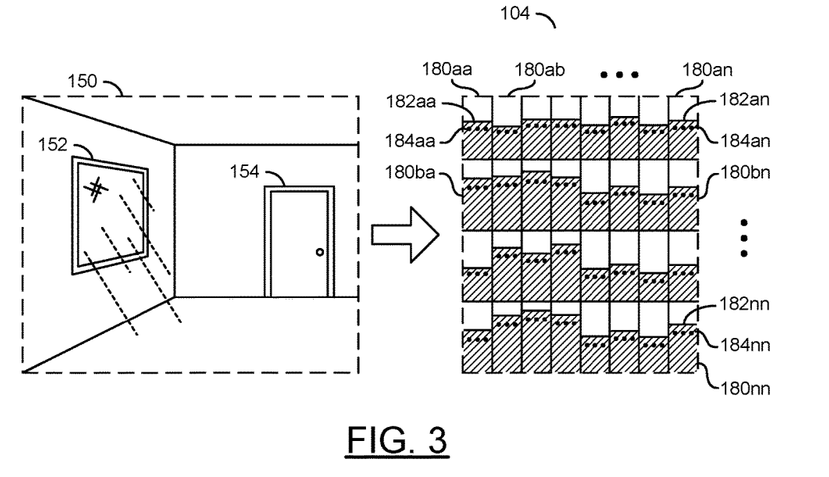
FIG. 3 is a diagram illustrating example ambient light sensor segments.

Referring to FIG. 3, a diagram illustrating example ambient light sensor segments is shown. A video frame 150 and the segmented ambient light sensor 104 are shown. The video frame 150 may be an example video frame generated by the video processor 100. The segmented ambient light sensor 104 may show light levels detected by the segmented ambient light sensor 104 corresponding to the scene shown in the video frame 150.

The video frame 150 may represent an environment captured by the camera 52. The video frame 150 may show a window 152 and a door 154. The window 152 and the door 154 may not be objects of interest. For example, if the ambient light sensor 104 presented the signal INT to the MCU 106 to initiate a power on of the processor 100 in response to the window 152 and/or the door 154, the detection by the ambient light sensor 104 would be considered a false alarm. In the example shown, the window 152 may represent an area of the video frame 150 having a high level of brightness. In the example shown, the door 154 may represent an area of the video frame 150 having a low level of brightness.

The ambient light sensor 104 may operate independently of the video frame 150 being captured by the image capture sensor 110 and/or the processor 100. For example, the ambient light sensor 104 may operate when the image capture sensor 110 and/or the processor 100 are powered down. In another example, the ambient light sensor 104 may be shut down when the image capture sensor 110 and/or the processor 100 are powered on to conserve an amount of power provided by the battery 116 consumed by an operation of the segmented ambient light sensor 104. The video frame 150 and the light detected by the ambient light sensor 104 are shown together for comparative purposes.

The ambient light sensor 104 may comprise a number of segments 180aa-180nn. The segments 180aa-180nn are shown arranged in a grid pattern. For example, a first row of segments of the ambient light sensor 104 may be the segments 180aa-180an. In another example, a second row of segments of the ambient light sensor 104 may be the segments 180ba-180bn. In yet another example, the last row of segments of the ambient light sensor 104 may be the segments 180na-180nn. In still another example, a first column of segments of the ambient light sensor 104 may be the segments 180aa-180na. The number and/or size of the segments 180aa-180nn may be varied according to the design criteria of a particular implementation.

Each of the segments 180aa-180nn may have a respective detection level 182aa-182nn. The detection levels 182aa-182nn may correspond to an amount of light detected by the ambient light sensor 104 at a location of a particular one of the segments 180aa-180nn. In the example shown, higher values of the detection levels 182aa-182nn may correspond to a greater intensity of light detected. For example, the detection levels 182aa-182nn that are generally located to the left of the ambient light sensor 104 may correspond to the higher light levels at the location of the window 152 in the video frame 150. In another example, the detection levels 182aa-182nn that are generally located to the right of the ambient light sensor 104 may correspond to the lower light levels at the location of the door 154 in the video frame 150. In some embodiments, lower values of the detection levels 182aa-182nn may correspond to a lower intensity of light detected. The amount of light intensity associated with the detection levels 182aa-182nn may be varied according to the design criteria of a particular implementation.

Each of the segments 180aa-180nn may have a respective detection threshold level 184aa-184nn. The detection threshold levels 184aa-184nn may be an amount of light intensity that triggers a response from the ambient light sensor 104. For example, the ambient light sensor 104 may generate the signal INT in response to one or more of the detection levels 182aa-182nn crossing the detection threshold levels 184aa-184nn. In some embodiments, the signal INT may be generated when one or more of the detection levels 182aa-182nn is above the detection threshold levels 184aa-184nn. In some embodiments, the signal INT may be generated when one or more of the detection levels 182aa-182nn is below the detection threshold levels 184aa-184nn.

The detection threshold levels 184aa-184nn may be different for each of the segments 180aa-180nn. The detection threshold levels 184aa-184nn may be modified and/or adjusted (e.g., in response to feedback forwarded by the MCU 106 presented in the signal A_OUT). For example, the detection threshold levels 184aa-184nn may be higher in areas where more light is expected (e.g., corresponding to the location of the window 152). In another example, the detection threshold levels 184aa-184nn may be adjusted based on a time of day (e.g., different settings for day and for night) and/or time of year. In the example shown, all of the detection levels 182aa-182nn are shown above the detection threshold levels 184aa-184nn and no signal is generated by the ambient light sensor 104 (e.g., no object has been detected by the detection device).

Figure 4:
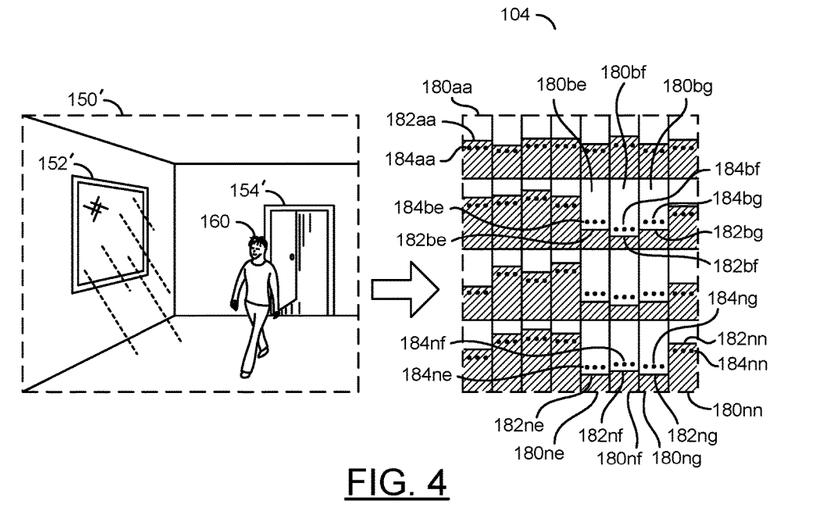
FIG. 4 is a diagram illustrating an example ambient light sensor detecting an object.

Referring to FIG. 4, a diagram illustrating an example ambient light sensor detecting an object is shown. The ambient light sensor 104 may be configured similar to the arrangement described in association with FIG. 3. The video frame 150' may show the window 152', the door 154' and/or an object 160. The door 154' is shown open. The object 160 is shown as a person. The open door 154' and the presence of the object 160 may result in a portion of the environment captured in the video frame 150' having a different light intensity (e.g., darker) than the environment captured in the video frame 150.

The segments 180aa-180nn are shown. The segments 180aa-180nn may have the same detection threshold levels 184aa-184nn as shown in association with FIG. 3. Since the object 160 and the open door 154' are only a portion of the video frame 150', most of the values of the detection levels 182aa-182nn may be similar to the values of the detection levels 182aa-182nn shown in association with FIG. 3. The segments 180be-180bg, 180ce-180cg and/or 180ne-180ng may be the segments associated with the open door 154' and the object 160.

The detection levels 182be-182bg, 182ce-182cg and 182ne-182ng associated with the segments 180be-180bg, 180ce-180cg and/or 180ne-180ng are shown below the detection threshold levels 184be-184bg, 184ce-184cg and/or 184ne-184ng. The detection levels 182be-182bg, 182ce-182cg and 182ne-182ng may be lower in response to the open door 154' and/or the object 160. In response to at least one of the detection levels 182be-182bg, 182ce-182cg and 182ne-182ng dropping below the detection threshold levels 184be-184bg, 184ce-184cg and/or 184ne-184ng, the ambient light sensor 104 may generate the signal INT.

Figure 5:
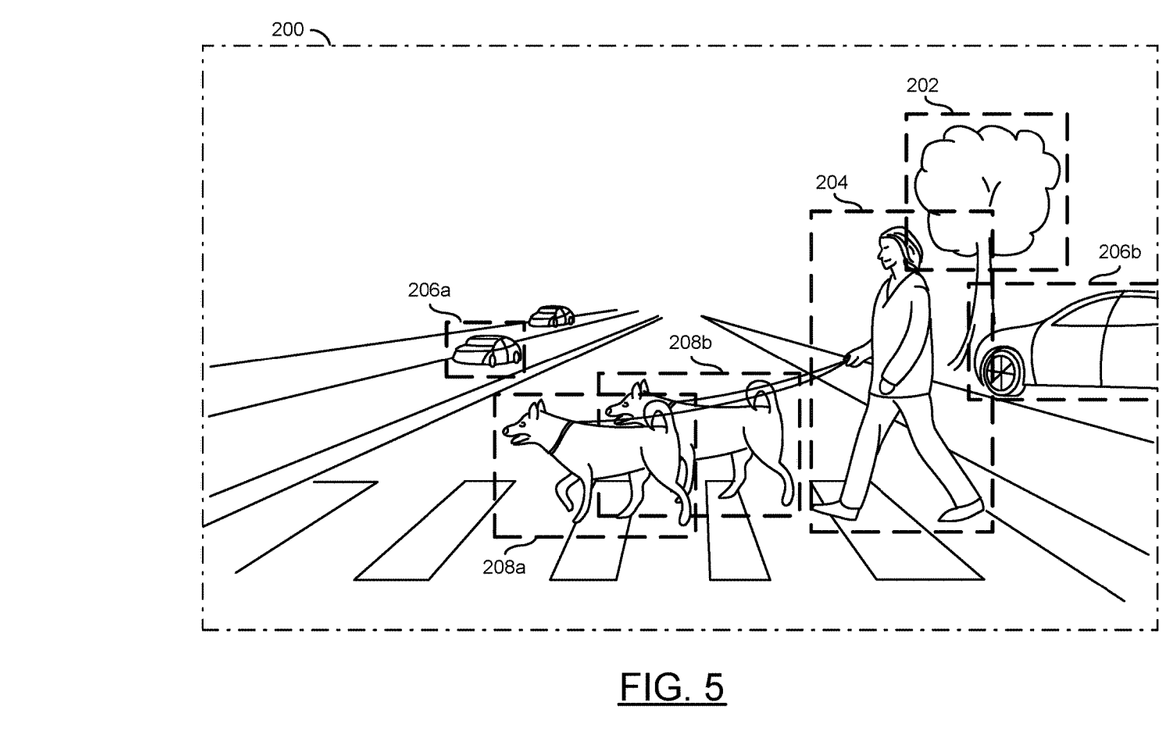
FIG. 5 is a diagram illustrating objects detected by video analytics in a video frame.

Referring to FIG. 5, objects detected by video analytics in a video frame 200 are shown. The processor 100 may be configured to perform video analytics on the video frames (e.g., the video frame 200) captured by the image sensor 110. The video analytics performed by the processor 100 may implement local video analytics (e.g., performed before streaming and/or transmitting the video frames to an off-camera device). The local video analytics may identify, locate and/or recognize particular video data as a known type of object (e.g., a person, an animal, vegetation, vehicles, bicycles, locations, etc.). The local video analytics performed by the processor 100 may be configured to identify whether detections by the detection devices 102a-102n and/or 104 are false alarms.

The video frame 200 is shown comprising various objects 202, 204, 206a-206b and/or 208a-208b. The object 202 may be a tree. The object 204 may be a person. The objects 206a-206b may be vehicles. The objects 208a-208b may be dogs. The types of the objects detected may be varied according to the design criteria of a particular implementation.

In some embodiments, the camera 52 may be configured to detect particular types of objects. For example, in some embodiments, the tree 202 may not be considered useful data captured by the camera 52 (e.g., detecting the tree would be considered a false alarm). In another example, the person 204 may be considered an object of interest. In yet another example, the dogs 208a-208b may not be considered useful data captured by the camera 52 unless located in close proximity to the person 204. Other objects (e.g., road markings) may not be considered useful data depending on the objects of interest (e.g., information stored in the memory 112).

In an example embodiment, the camera 52 may be implemented to monitor pedestrian traffic at a particular location. When monitoring pedestrian traffic, the person 204 and/or the dogs 208a-208b may be the objects of interest and the vehicles 206a-206b may not be considered useful data. In one example, the motion of the oncoming vehicle 206a may be detected by one or more of the motion sensors 102a-102n. The MCU 106 may receive one or more of the signals MINPUT_A-MINPUT_N and generate the signal WAKE_UP to activate the image processor 100. The processor 100 may activate the image capture sensor 110 and/or begin analyzing the video frames. Since the oncoming vehicle 206a is not an object of interest, the vehicle 206a being detected by the motion sensors 102a-102n may be considered a false alarm. The processor 100 may generate the signal FEEDBACK for the MCU 106, and the MCU 106 may generate one or more of the signals MINPUT_A-MINPUT_N for the motion sensors 102a-102n. For example, the motion sensors 102a-102n providing coverage for the zones 132a-132n corresponding to the oncoming traffic lane may be disabled in response to the feedback from the processor 100.

In another example where the camera 52 is configured to monitor pedestrian traffic, one of the motion sensors 102a-102n may detect motion caused by the person 204 and present one or more of the signals MINPUT_A-MINPUT_N to the MCU 106. The MCU 106 may generate the signal A_OUT to activate the ambient light sensor 104. The ambient light sensor 104 may detect the change in light caused by the person 204 and generate the signal INT. The MCU 106 may detect the signal INT and generate the signal WAKE_UP to activate the processor 100. The processor 100 may perform the local video analytics and detect the person 204 as an object of interest. The processor 100 may transmit the video signal VIDEO to the memory 112 for storage and/or to the communications module 114 to be transmitted to an external storage medium. In some embodiments, the processor 100 may provide positive feedback to the detection devices 102a-102n and/or 104 to allow for adjustments in response to valid detections.

The local video analytics performed by the processor 100 may implement motion detection by determining a difference between frames with foreground/background separation. In another example, deep learning techniques may be performed by the processor 100 by scanning frames for known patterns and feed the frames to a neural network (e.g., via the signal STREAM and/or stored in the memory 112). In some embodiments, the memory 112 may implement the neural network. In some embodiments, the neural network may be implemented by a cloud computing service (e.g., a network of computers configured to perform computations that scale on demand). In an example, a user may communicate with the processor 100 via the communications module 116 (e.g., via an app on a smartphone, a desktop computer, a tablet computing device, etc.).

The user may provide feedback to the neural network to make the activation more intelligent (e.g., based on the desires of the user). In one example, one user may not want the camera 52 to activate in response to a pet. In another example, one user may want the camera 52 to activate in response to a pet. When the processor 100 determines the pet is a false alarm (or an object of interest), the user may be asked whether to ignore the object in the future. If the user responds that the processor 100 should ignore pets in the future, the detection of the pet may be classified as a false alarm. If the user responds that the processor 100 should not ignore pets in the future, the detection of the pet may be classified as a valid detection. The user may have an option to review all detections by the processor 100 to check what has been tagged as a false alarm. The user may have an option to re-classify a false alarm as a valid detection and/or a valid detection as a false alarm. The classifications and/or re-classifications may be stored in the memory 112 to be used as input for the neural network.

In some embodiments, the local video analytics performed by the processor 100 may perform a compensation for sensor noise, detect light changes, compare a size of the object to a known object size (e.g., minimum/maximum object sizes), determine a motion speed, detect partial occlusions, determine periodic motions, and/or determine positive rejections. The image/video processing techniques performed by the processor 100 may implement computer vision to look for objects of interest (e.g., the person 204), and filter out any other object (e.g., the tree 202, the vehicles 206a-206b and/or the dogs 208a-208b, etc.).

The processor 100 may implement a programmable filter. For example, animals (e.g., dogs, birds, cats, rodents, etc.) passing in front of the lens 108 and/or heat from vehicles may trigger the motion sensors 102a-102n but would be filtered out by the computer vision techniques. False alarms may be caused due to rain drops on the motion sensors 102a-102n (e.g., resulting in a change of heat distribution), air blowing from a vent and/or a heat source. Any change in heat in the environment that is not due to an intrusion by the detected objects may result in a false alarm. The programmable filter implemented by the processor 100 and/or the ambient light sensor 104 may be configured to conserve the battery 116 by detecting the false alarms and preventing an activation of one or more of the power consuming functions of the camera 52.

Figure 6:
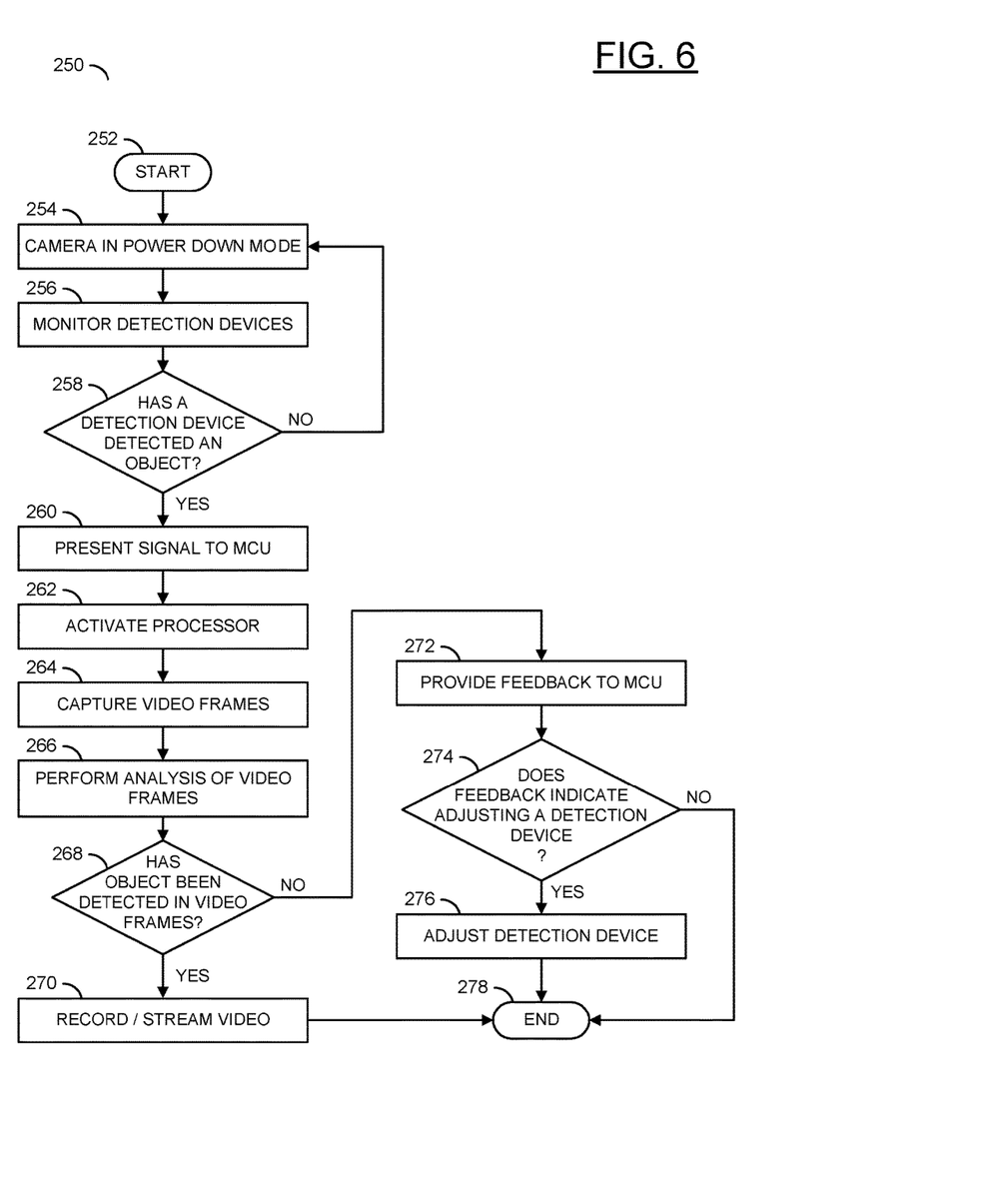
FIG. 6 is a flow diagram illustrating a method for saving battery life on a battery-powered IP camera.

Referring to FIG. 6, a method (or process) 250 is shown. The method 250 may save battery life on a battery-powered IP camera. The method 250 generally comprises a step (or state) 252, a step (or state) 254, a step (or state) 256, a decision step (or state) 258, a step (or state) 260, a step (or state) 262, a step (or state) 264, a step (or state) 266, a decision step (or state) 268, a step (or state) 270, a step (or state) 272, a decision step (or state) 274, a step (or state) 276, and a step (or state) 278.

The state 252 may start the method 250. In the state 254, the camera 52 may be in a power down mode (e.g., a sleep mode, a low power mode, etc.). In the state 256, the MCU 106 may monitor the detection devices (e.g., the motion sensors 102a-102n and/or the ambient light sensor 104). Next, in the decision state 258, the MCU 106 may determine whether one or more of the detection devices 102a-102n and/or 104 have detected an object.

If one or more of the detection devices 102a-102n and/or 104 have not detected an object, the method 250 may return to the state 254. If one or more of the detection devices 102a-102n and/or 104 have detected an object, the method 250 may move to the state 260. In the state 260, the detection devices 102a-102n (or 104) may present the signal (e.g., MINPUT_A-MINPUT_N and/or INT) to the MCU 106. Next, in the state 262, the MCU 106 may activate the processor 100 (e.g., present the signal WAKE_UP). Next, in the state 264, the image capture sensor 110 may capture video frames (e.g., the signal FRAMES) to present to the processor 100. In the state 266, the processor 100 may perform analysis of the video frames (e.g., local video analytics). Next, the method 250 may move to the decision state 268. In the decision state 268, the processor 100 may determine whether an object of interest has been detected in the video frames.

If an object has been detected in the video frames, the method 250 may move to the state 270. In the state 270, the processor may record and/or stream the signal VIDEO (e.g., via the memory 112 and/or the communications module 114). Next, the method 250 may move to the state 278. If an object has not been detected in the video frames, the method 250 may move to the state 272. In the state 272, the processor 100 may provide feedback (e.g., the signal FEEDBACK) to the MCU 106. Next, the method 250 may move to the decision state 274. In the decision state 274, the MCU 106 may determine whether the feedback indicates adjusting one or more of the detection devices 102a-102n and/or 104.

If the feedback indicates adjusting one or more of the detection devices 102a-102n and/or 104, the method 250 may move to the state 276. In the state 276, the MCU 106 may adjust one or more of the detection devices 102a-102n and/or 104 (e.g., via the signals MOUT_A-MOUT_N and/or A_OUT). Next, the method 250 may move to the state 278. If the feedback does not indicate adjusting one or more of the detection devices 102a-102n and/or 104, the method 250 may move to the state 278. The state 278 may end the method 250.

For example, when the activation of the processor 100 is generated in response to a detection by the PIR sensors 102a-102n, the processor 100 may use on-camera video analytics. The video analytics may detect whether a human (e.g., an object of interest) is present in the scene. If not, the camera 52 (e.g., the processor 100, the ambient light sensor 104, the image capture sensor 110, etc.) may be shut off to save consumption of the battery 116. The PIR sensors 102a-102n may remain activated even when the camera 52 is shut off.

Figure 7:
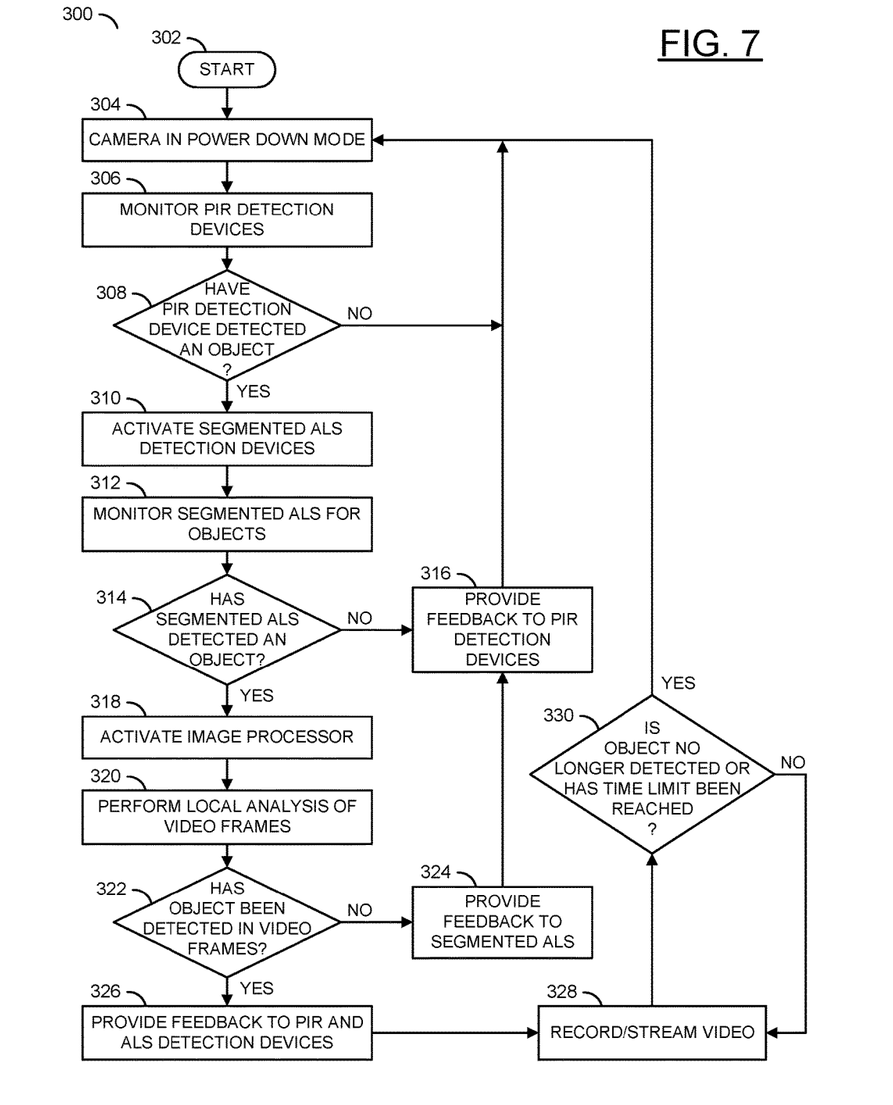
FIG. 7 is a flow diagram illustrating a method for a multi-step approach to saving battery life on a battery-powered IP camera.

Referring to FIG. 7, a method (or process) 300 is shown. The method 300 may save battery life on a battery-powered IP camera using a multi-step approach. The method 300 generally comprises a step (or state) 302, a step (or state) 304, a step (or state) 306, a decision step (or state) 308, a step (or state) 310, a step (or state) 312, a decision step (or state) 314, a step (or state) 316, a step (or state) 318, a step (or state) 320, a decision step (or state) 322, a step (or state) 324, a step (or state) 326, a step (or state) 328, and a decision step (or state) 330.

The state 302 may start the method 300. In the state 304, the camera 52 may be in a power down mode (e.g., a sleep mode, a low power mode, etc.). In the state 306, the MCU 106 may monitor the PIR detection devices 102a-102n. For example, the MCU 106 may monitor for the signals MINPUT_A-MINPUT_N generated by the PIR devices 102a-102n in response to motion. Next, the method 300 may move to the decision state 308. In the decision state 308, the MCU 106 may determine whether the PIR detection devices 102a-102n have detected an object (e.g., detected motion).

If an object has not been detected, the method 300 may return to the state 304. If an object has been detected, the method 300 may move to the state 310. In the state 310, the MCU 106 may activate the segmented ALS detection device 104 (e.g., by presenting the signal A_OUT). Next, in the state 312, the MCU 106 may monitor the segmented ALS detection device 104 for detected objects. For example, the MCU 106 may monitor for the signal INT generated by the ALS detection device 104 in response to detected light levels. Next, the method 300 may move to the decision state 314. In the decision state 314, the MCU 106 may determine whether the segmented ALS detection device 104 has detected an object (e.g., detected the ambient light levels 182aa-182nn crossing the detecting threshold levels 184aa-184nn).

If the segmented ALS detection device 104 has not detected an object, the method 300 may move to the state 316. In the state 316, the MCU 106 may provide feedback to the PIR detection devices 102a-102n (e.g., a false alarm has been detected). Next, the method 300 may return to the state 304. If the segmented ALS detection device 104 has detected an object, the method 300 may move to the state 318. In the state 318, the MCU 106 may activate the image processor 100 (e.g., the MCU 106 may receive the signal INT and generate the signal WAKE_UP). In some embodiments, the segmented ALS detection device 104 may be shut down to reduce a consumption of the battery 116. In some embodiments, the processor 100 may activate the image capture sensor 110. Next, in the state 320, the processor 100 may perform local analysis of the video frames (e.g., the signal FRAMES from the image capture sensor 110). Next, the method 300 may move to the decision state 322. In the decision state 322, the processor 100 may determine whether an object has been detected in the video frames.

If the object has not been detected in the video frames, the method 300 may move to the state 324 and then to the state 316. In the states 324 and 316, the processor 100 may provide feedback to the segmented ALS 104 and/or the PIR detection devices 102a-102n (e.g., the processor 100 may provide the signal FEEDBACK to the MCU 106 and the MCU 106 may generate one or more of the signals MOUT_A-MOUT_N and/or A_OUT to provide the feedback from the processor 100). Next, the method 300 may return to the state 304. If the object has been detected in the video frames, the method 300 may move to the state 326.

In the state 326, the processor 100 may provide feedback to the detection devices 102a-102n and/or 104 (e.g., using the signal FEEDBACK provided to the MCU 106). In some embodiments, the feedback from the processor 100 may be a positive feedback to indicate that an object has been properly detected by the detection devices 102a-102n and/or 104. Next, in the state 328, the processor 100 may initiate a recording and/or streaming of the signal VIDEO via the memory 112 and/or the communications module 114. Next, the method 300 may move to the decision state 330. In the decision state 330, the processor 100 may determine whether the object is no longer detected in the video frames or a time limit has been reached. If the object is still detected and/or time remains for the time limit, the method may return to the state 328. If the object is not detected and/or the time limit has expired (whichever occurs first), the method may return to the state 304.

The segmented ALS detection device 104 may be implemented as a second line of defense to verify an object when the motion sensors 102a-102n have been triggered. Generally, the ALS detection device 104 may consume too much power from the battery 116 to remain in an active state (e.g., greater than 5 mW). However by turning on the ALS detection device 104 only after the PIR detection devices 102a-102n trigger, the ALS detection device 104 may be used as a smart detector with multiple configurable zones (e.g., the segments 180aa-180nn). The ALS detection device 104 may be reconfigured by the video processor 100 after image analysis is performed (e.g., via the signal FEEDBACK) to improve a future positive detection rate and/or reduce false positives. A significant saving in consumption of the battery 116 may be observed by not waking up the processor 100.

In some embodiments, the processor 100 may implement a timer. The timer may provide a pre-determined amount of time. For example, the timer may be set by a user. The timer may determine an amount of time the processor 100 records the video. The timer may conserve the battery 116 by ensuring the processor 100 stops recording (e.g., times out) even when the object remains in the field of view of the lens 108 for a long amount of time. In an example, the processor 100 may continue recording until the object is no longer detected or the timer expires (whichever comes first).

Figure 8:
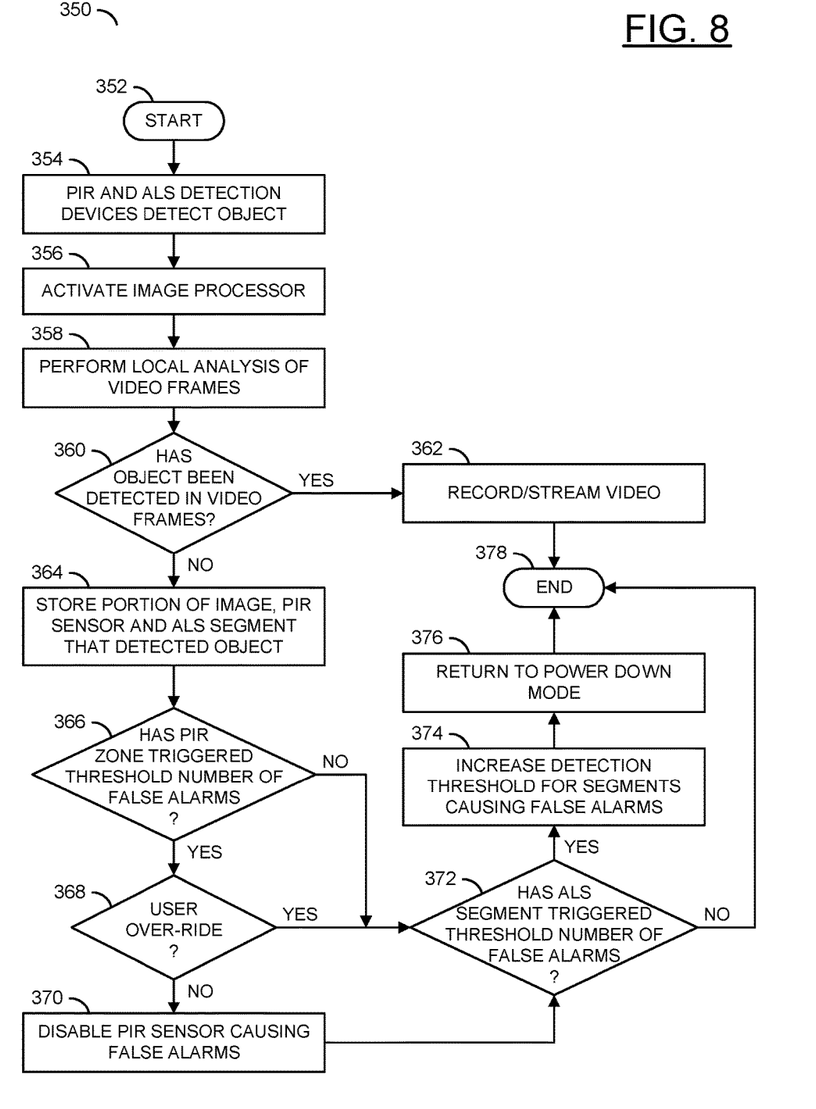
FIG. 8 is a flow diagram illustrating a method for re-configuring detection devices based on feedback about detected objects.

Referring to FIG. 8, a method (or process) 350 is shown. The method 350 may re-configure the detection devices 102a-102n and/or 104 based on feedback about detected objects. The method 350 generally comprises a step (or state) 352, a step (or state) 354, a step (or state) 356, a step (or state) 358, a decision step (or state) 360, a step (or state) 362, a step (or state) 364, a decision step (or state) 366, a decision step (or state) 368, a step (or state) 370, a decision step (or state) 372, a step (or state) 374, a step (or state) 376, and a step (or state) 378.

The state 352 may start the method 350. In the state 354, the PIR and/or ALS detection devices 102a-102n and/or 104 may detect an object (e.g., generate the signals MINPUT_A-MINPUT_N and/or INT). Next, in the state 356, the MCU 106 may activate the image processor 100 (e.g., by generating the signal WAKE_UP). In the state 358, the processor 100 may perform local analysis of the video frames. Next, the method 350 may move to the decision state 360. In the decision state 360, the processor 100 may determine whether an object of interest has been detected in the video frames.

If an object has been detected in the video frames, the method 350 may move to the state 362. In the state 362, the processor 100 may initiate a recording and/or streaming of the signal VIDEO via the memory 112 and/or the communications module 114. Next, the method 350 may move to the state 378. If an object has not been detected in the video frames, the method 350 may move to the state 364. In the state 364, the processor 100 may store a portion of the image (e.g., the video frame, a portion of the video frame, coordinates of the portion of the video frame that triggered the false alarm, etc.), the PIR sensors 102a-102n and/or the segments 180aa-180nn that detected the object (e.g., detected a false positive). Next, the method 350 may move to the decision state 366. In the decision state 366, the processor 100 may determine whether the PIR zones 132a-132n that triggered the false alarm have triggered a threshold number of false alarms. The threshold number may be a pre-determined number and/or a number selected by a user.

If the PIR zones 132a-132n have not triggered a threshold number of false alarms, the method 350 may move to the decision state 372. If the PIR zones 132a-132n have triggered a threshold number of false alarms, the method 350 may move to the decision state 368. In the decision state 368, the processor 100 may determine whether there is an optional user over-ride. If there is a user over-ride, the method 350 may move to the decision state 372. If there is not a user over-ride, the method 350 may move to the state 370. In the state 370, the MCU 106 may disable (or adjust a sensitivity of) the PIR sensors 102a-102n associated with the zones 132a-132n that are detecting the false positives. Next, the method 350 may move to the decision state 372. In the decision state 372, the processor 100 may determine whether the ALS segments 180aa-180nn that triggered the false alarm have triggered a threshold number of false alarms. The threshold number may be a pre-determined number and/or a number selected by a user.

If the ALS segments 180aa-180nn that triggered the false alarm have not triggered a threshold number of false alarms, the method 350 may move to the state 378. If the ALS segments 180aa-180nn that triggered the false alarm have triggered a threshold number of false alarms, the method 350 may move to the state 374. In the state 374, the MCU 106 may increase the detection threshold levels 184aa-184nn for the segments 180aa-180nn causing the false alarms (e.g., via the signal A_OUT and based on the signal FEEDBACK received from the processor 100). Next, in the state 376, the camera 52 may return to the power down mode. Next, the method 350 may move to the state 378. The state 378 may end the method 350.

The motion sensors 102a-102n may be configured to provide coverage for the zones 132a-132n within the field of view of the camera 52. If a particular one of the zones 132a-132n triggers false alarms frequently, the processor 100 and/or the MCU 106 may automatically turn off the motion sensors 102a-102n causing the false alarms to prevent further false alarms. In some embodiments, the user may receive a prompt to ask the user before turning off one or more of the motion sensors 102a-102n.

Similarly, the processor 100 may determine if a detection by the ALS sensor 104 is not valid (e.g., a false alarm). For example, if one or more of the segments 180aa-180nn repeatedly trigger an activation of the processor 100, the processor 100 may provide feedback. The feedback may be used by the MCU 106 to increase the detection threshold levels 184aa-184nn of segments 180aa-180nn that cause the false alarms. After verifying the detection of the motion sensors 102a-102n, the segmented ambient light sensor 104 may return to a sleep (or low power) mode of operation.

The memory 112 may store the number of false alarms detected by each of the motion sensors 102a-102n. The memory 112 may store the number of false alarms detected by each of the segments 180aa-180nn. In some embodiments, the processor 100 may provide feedback to disable one or more of the motion sensors 102a-102n and/or the segments 180aa-180nn even when there has been an object of interest confirmed by the video analysis. For example, if one of the PIR sensors (e.g., 102a) detects a vehicle that is not an object of interest and another of the PIR sensors (e.g., 102b) detects a person that is an object of interest and both the PIR sensors 102a and 102b trigger the activation of the processor 100, the processor 100 may determine that the motion sensor 102a (and/or the segments 180aa-180nn) that triggered the activation due to detecting the vehicle has still triggered a false alarm, even though there was an object of interest in another part of the field of view of the lens 108.

The memory 112 may store a map of the field of view of the lens 108. The map may be used to store coordinates of the portion of the field of view where the false alarms have been triggered. The map may be implemented to determine which of the detection devices 102a-102n and/or which segments 180aa-180nn are triggering the false alarms. The implementation of the map may be varied according to the design criteria of a particular implementation.

Figure 9:
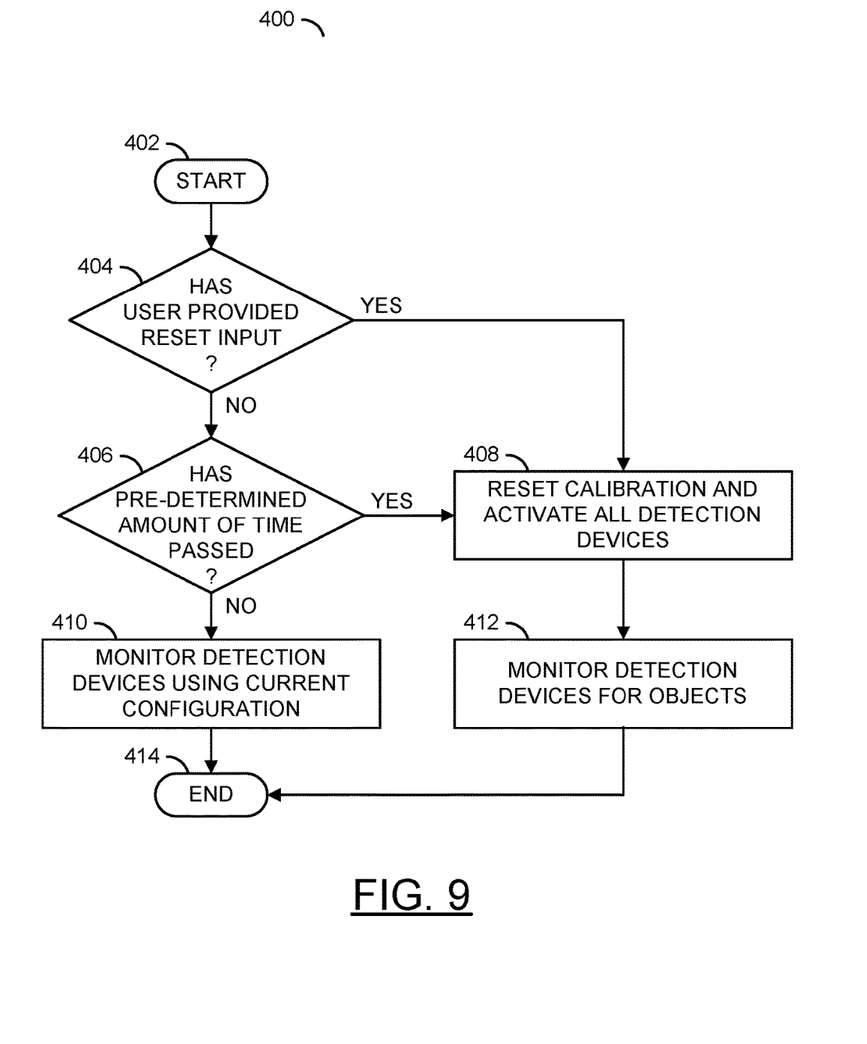
FIG. 9 is a flow diagram illustrating a method for resetting detection devices.

Referring to FIG. 9, a method (or process) 400 is shown. The method 400 may reset the detection devices 102a-102n and/or 104. The method 400 generally comprises a step (or state) 402, a decision step (or state) 404, a decision step (or state) 406, a step (or state) 408, a step (or state) 410, a step (or state) 412, and a step (or state) 414.

The state 402 may start the method 400. Next, the method 400 may move to the decision state 404. In the decision state 404, the processor 100 and/or the MCU 106 may determine whether the user has provided a reset input. If the user has provided the reset input, the method 400 may move to the state 408. If the user has not provided the reset input, the method 400 may move to the decision state 406. In the decision state 406, the processor 100 may determine whether a pre-determined amount of time has passed.

If a pre-determined amount of time has passed, the method 400 may move to the state 408. In the state 408, the processor 100 may provide feedback to reset a calibration of one or more of the detection devices 102a-102n and/or 104 (e.g., via the signal FEEDBACK). Next, the method 400 may move to the state 412. In the state 412, the MCU 106 may monitor the detection devices 102a-102n and/or 104 for objects (e.g., monitor for the signals MINPUT_A-MINPUT_N and/or INT generated by the detection devices 102a-102n and/or 104 in response to a particular stimulus). Next, the method 400 may move to the state 414. If a pre-determined amount of time has not passed, the method 400 may move to the state 410. In the state 410, the MCU 106 may monitor the detection devices 102a-102n and/or 104 using the current configuration. Next, the method 400 may move to the state 414. The state 414 may end the method 400.

The detection devices 102a-102n and/or 104 may be reset. In one example, the detection devices 102a-102n and/or 104 may be reset in response to a user input (e.g., a command input from a connected device via the communications module 114 such as a smartphone, a tablet computing device and/or a desktop computer). In another example, the detection devices 102a-102n and/or 104 may be reset in response to an amount of time passing (e.g., an absolute limit, a period of time, etc.). Resetting the configuration of the detection devices 102a-102n and/or 104 may prevent all of the detection devices 102a-102n and/or 104 from being disabled due to false alarms. For example, over time, every one of the detection devices 102a-102n and/or 104 may accumulate the threshold number of false alarms and be shut down in response to feedback from the processor 100. In some embodiments, resetting the configuration of the detection devices 102a-102n and/or 104 may reduce a count of the false alarms to zero. In some embodiments, resetting the configuration of the detection devices 102a-102n and/or 104 may reduce a count of the false alarms by a pre-determined amount after a pre-determined amount of time has passed (e.g., decrement the false alarm count by one every 24 hours). Resetting the detection devices 102a-102n and/or 104 may allow the detection devices 102a-102n and/or 104 to be refreshed and/or reconfigured.

The functions and structures illustrated in the diagrams of FIGS. 1 to 9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a plurality of first detection devices each configured to detect an object in a respective zone;
    a second detection device configured to detect said object in one or more of a plurality of segments;
    a processor configured to (i) perform analysis of one or more frames of a video captured by an image sensor and (ii) evaluate a detection of said object by said first detection devices and said second detection device based on said analysis; and
    a controller configured to (i) activate said second detection device in response to one or more of said first detection devices detecting said object, (ii) activate said processor in response to said second detection device detecting said object and (iii) provide feedback to said first detection devices and said second detection device based on said evaluation by said processor.

2. The apparatus according to claim 1, wherein said plurality of first detection devices are passive infrared (PIR) sensors.

3. The apparatus according to claim 1, wherein said second detection device is a segmented ambient light sensor.

4. The apparatus according to claim 1, wherein said evaluation is used to determine false positives detected by said first detection devices and said second detection device.

5. The apparatus according to claim 1, wherein said feedback is used to shut off one or more of said first detection devices.

6. The apparatus according to claim 1, wherein said processor is configured to provide an option to a user to shut off one or more of said first detection devices.

7. The apparatus according to claim 1, wherein said feedback is used to re-configure a detection threshold of said plurality of segments.

8. The apparatus according to claim 1, wherein if said evaluation does not confirm said objects, said processor is shut off.

9. The apparatus according to claim 1, wherein (i) a power consumption of said plurality of first detection devices is less than a power consumption of said second detection device and (ii) said power consumption of said second detection device is less than a power consumption of said processor.

10. The apparatus according to claim 1, wherein said first detection devices are configured to operate unless shut down in response to said feedback.

11. The apparatus according to claim 1, wherein said analysis of said one or more frames of said video comprises at least one of (a) motion detection of said objects, (b) scanning said frames for known patterns and (c) computer vision.

12. The apparatus according to claim 11, wherein said known patterns are stored and updated in a neural network.

13. The apparatus according to claim 12, wherein said neural network is configured to update said known patterns in response to user input.

14. The apparatus according to claim 1, wherein said analysis of said one or more frames of said video comprises at least one of a compensation for sensor noise, detecting light changes, comparing a size of said objects, determining a motion speed of said objects, detecting partial occlusions, determining periodic motion and determining positive rejections.

15. The apparatus according to claim 1, wherein said processor is further configured to upload said video to an external storage device.

16. The apparatus according to claim 15, wherein said external storage device is a cloud storage service.

17. The apparatus according to claim 1, wherein a reset of at least one of said plurality of said first detection devices and said second detection device is performed (i) in response to said feedback and (ii) after a pre-determined amount of time.

18. The apparatus according to claim 1, wherein said image sensor is configured to capture said video until at least one of (a) a pre-determined amount of time has passed and (b) said objects are no longer detected.

19. The apparatus according to claim 1, wherein said apparatus further comprises a communications module configured to receive input from a user and said input is configured to activate said processor.

20. An apparatus comprising:
a plurality of detection devices each configured to detect an object in a respective zone;
a processor configured to (i) perform analysis of one or more frames of a video captured by an image sensor and (ii) evaluate a detection of said object by at least one of said detection devices based on said analysis; and
a controller configured to (i) activate said processor in response to said object detected by at least one of said detection devices and (ii) provide feedback to at least one of said detection devices based on said evaluation by said processor.

* * * * *